United States Patent [19]

Shirako et al.

[11] Patent Number: 5,612,941

[45] Date of Patent: Mar. 18, 1997

[54] INFORMATION SIGNAL EDIT METHOD AND APPARATUS

[75] Inventors: Yukio Shirako, Tokyo; Yoshio Kishi, Kanagawa; Yukihiro Maruyama, Tokyo; Hiroyuki Fujikura, Kanagawa, all of Japan

[73] Assignee: Sony Corporation, Tokyo, Japan

[21] Appl. No.: 694,265

[22] Filed: Aug. 8, 1996

[30] Foreign Application Priority Data

Aug. 18, 1995 [JP] Japan .................................. 7-233407

[51] Int. Cl.$^6$ .................................................. G11B 27/00
[52] U.S. Cl. .............................. 369/83; 369/32; 360/13
[58] Field of Search .............................. 369/83, 84, 47, 369/48, 54; 360/13, 15

[56] References Cited

U.S. PATENT DOCUMENTS 4,283,745  8/1981  Kuper et al. .............................. 360/13
4,685,001  8/1987  Martin ...................................... 369/83
5,471,452  11/1995  Kishi ........................................ 369/83
5,473,595  12/1995  Hayashi et al. ........................... 369/83
5,563,866  10/1996  Taguchi et al. ........................... 369/83

Primary Examiner—Tan Dinh
Attorney, Agent, or Firm—William S. Frommer; Alvin Sinderbrand

[57] ABSTRACT

A command from a remote terminal of an editor is supplied to a system controller in an information reproducer. The system controller controls a control circuit and a reproducing circuit, and sets address information in an address output circuit. During virtual reproduction, the system controller sets virtual address information in the address output circuit, and the virtual address information signal is output to an address input terminal of the editor. A reproduced information signal from the reproducing circuit is supplied to an information input terminal of the editor via an information output circuit.

7 Claims, 10 Drawing Sheets

INFORMATION SIGNAL EDIT METHOD AND APPARATUS

BACKGROUND OF THE INVENTION

1. Field of the Invention

This invention relates to information signal edit method and apparatus for use in an edit system made up of, for example, an editor, information recorder and information reproducer.

2. Description of the Related Art

FIG. 10 shows a conventional edit system made of, principally, an editor 1, information recorder 2 and information reproducer 3. In response to a remote control through the editor 1, the information reproducer 3 reproduces information recorded on a medium, and the information recorder 2 records the reproduced information. As shown in FIG. 10, the editor 1 has a remote (R) terminal 4, address input (R) terminal 5, address output (R) terminal 6, information input (R) terminal 7, and information output (R) terminal 8 in correspondence with the information recorder 2, and further has a remote (P) terminal 9, address input (P) terminal 10, address output (P) terminal 11, and information input (P) terminal 12 in correspondence with the information reproducer 3. The editor 1 outputs a chase command to control the information recorder 2 and the information reproducer 3 such that the information recorder 2 synchronizes with the address output (R) terminal 6 and the information reproducer 3 with the address output (P) terminal 11.

Upon actual edition, remote control signals are output from the remote (R) terminal 4 and from the remote (P) terminal 9 of the editor 1 to the information recorder 2 and to the information reproducer 3, respectively, to control their operation and to determine edit address points. In response to the remote control signals from the remote (R) terminal 4 and the remote (P) terminal 9, locating (pre-roll) at an address slightly (for example, 5 to 10 seconds) forward of the edit address point is executed such that information recorder 2 and the information reproducer 3 can start their operations in synchronism from their address points.

In addition to activating the information recorder 2 and the information reproducer 3 for reproducing operation, the editor 1 also monitors address information signals supplied from the information recorder 2 and from the information reproducer 3 to the address input (R) terminal 5 and the address input (P) terminal 10 during the reproducing operation. If the information recorder 2 and the information reproducer 3 do not synchronize, then the editor 1 controls them to establish their synchronization. After that, the editor 1 makes the information recorder 2 and the information reproducer 3 to start their operations from their edit address points in response to the remote control signals from the remote (R) terminal 4 and the remote (P) terminal 9.

When the information reproducer 3 used in the conventional edit system is one, like a compact disc (CD) reproducer, intended for use with a medium having no address information before its first program (e.g. a first piece of music) at the head of the medium, the edit system cannot locate (pre-roll) the medium at a point preceding the head of the medium, and cannot reproduce and edit the initial part of the first music at the head of the medium.

OBJECT AND SUMMARY OF THE INVENTION

It is therefore an object of the invention to provide an information signal edit method and apparatus that enables reproduction and edition even of an initial part of a first program at the head of a medium, such as a compact disk, on which information is recorded from its head.

According to the invention, there is provided an information signal edit method and apparatus. In the present invention, when a command to locate (pre-roll) the medium forward of its head is issued from the editor, the medium is located at the reproducible first address at its head, a virtual address information signal is sent to the editor, and a notice informing completion of locating is sent to the editor. When the information reproducer receives the command for reproduction from the editor, it sustains the reproducing operation and increments the virtual address information signal until shifting the current address into the reproducible second address, and then outputs the virtual address information signal to the editor in synchronism with a timing signal. When the current address becomes equal to the second address, the information reproducer executes actual playback operation, and outputs the actually reproduced address information signal to the editor. Through this process, the information reproducer can reproduce and edit information at the head of the medium, pursuant to the command from the editor.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
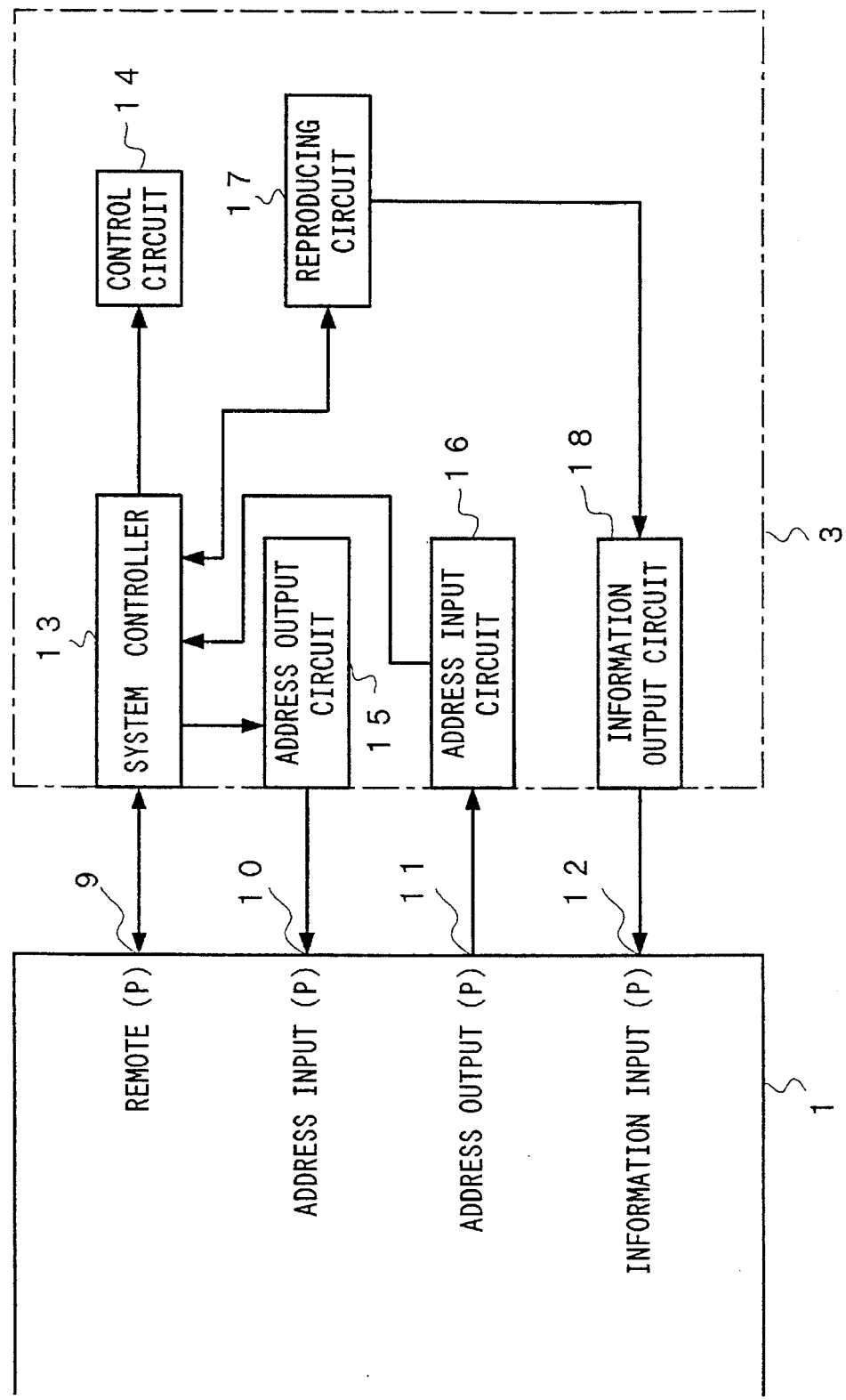
FIG. 1 is a block diagram showing the construction of an information signal edit system according to a first embodiment of the invention.

The first embodiment of the invention is explained below. FIG. 1 shows the construction of an information signal edit system according to the first embodiment. The edit system basically comprises an editor 1, information recorder 2 (not shown in FIG. 1) and information reproducer 3. Connection between the editor 1 and the information recorder 2 is the same as the conventional system referred to above, and is therefore omitted from the explanation made here.

In FIG. 1, the editor 1 is of a type that requires pre-roll for edition of information signals, and controls the information recorder 2 (not shown) and the information reproducer 3 to establish their synchronization. The editor 1 outputs a remote control signal through its remote (P) terminal 9 to control the information reproducer 3. The command from the remote (P) terminal 9 is delivered to the system controller 13 of the information reproducer 3.

The system controller 13 controls the control circuit 14 and the reproducing circuit 17, and sets address information in the address output circuit 15. The control circuit 14 controls behaviors (reproduction, fast-forwarding, and so on) of the information reproducer 3, and a signal indicating the current behavior to the system controller 13. The reproducing circuit 17 obtains reproduced information from a medium. The address information signal from the address output circuit 15 is sent to the address input (P) terminal 10 of the editor 1. The reproduced information signal from the reproducing circuit 17 is supplied to the information input (P) terminal 12 of the editor 1 via the information output circuit 18. Address information to be used for chase reproduction is output from the address output (P) terminal 11 of the editor 1 to the address input circuit 16 of the information reproducer 3. The address information signal used here is a time code comprising some digits for hour, minute, second and frame.

Figure 2:
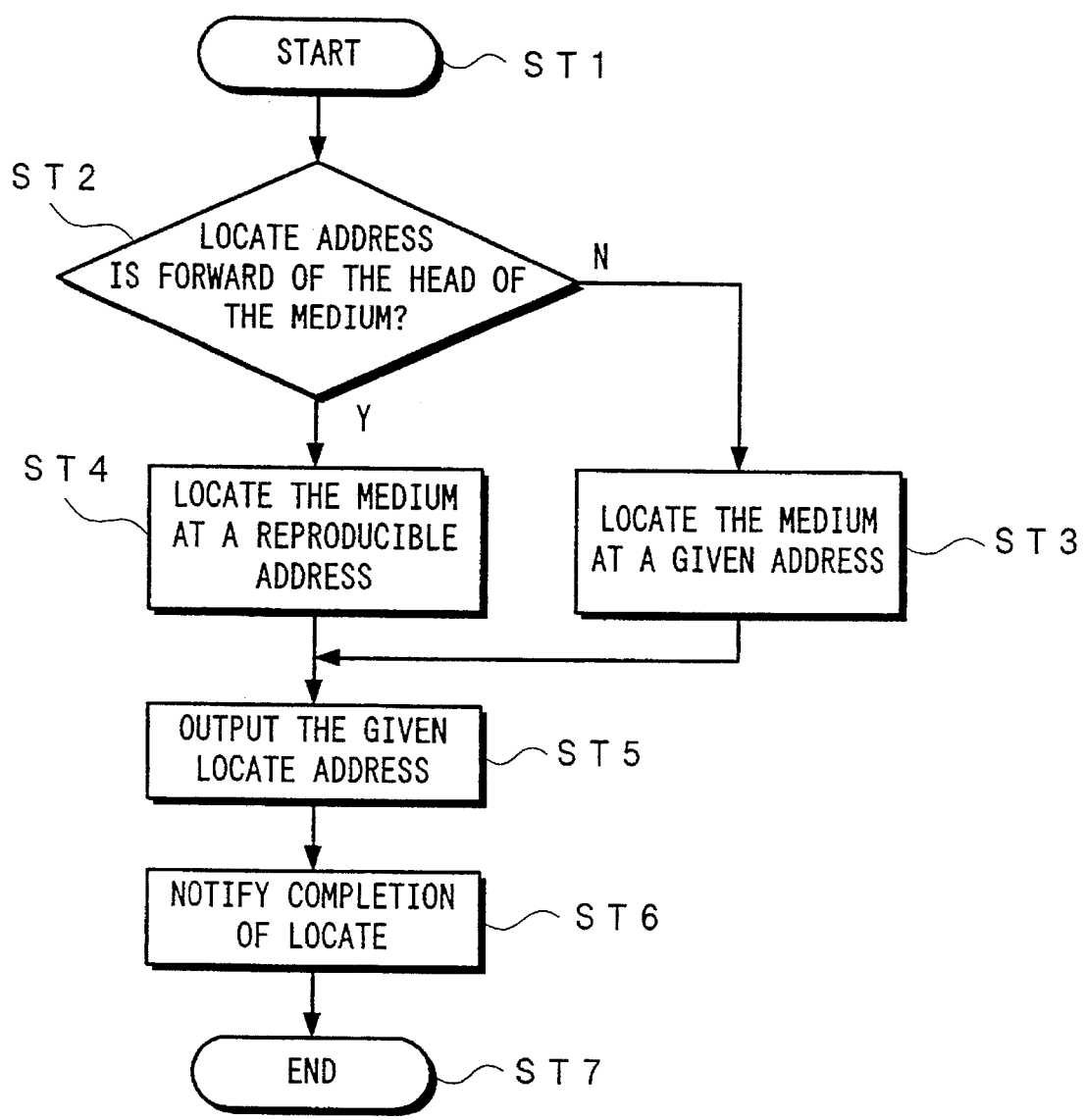
FIG. 2 is a flow chart of a locate (pre-roll) process according to the first embodiment of the invention.

FIG. 2 shows a sequence of a locate (pre-roll) process performed by the system controller 13. In step ST1, the editor 1 selects the point C of FIG. 4 as the edit address point for the information reproducer 3, and delivers to the information reproducer 3 a command for locating (pre-roll) at a first address point, i.e. point A of FIG. 4, which is forward of the edit address point (for example, 5 to 10 seconds forward of the edit address point). That is, in FIG. 4, when the edit address point is point C, the first address forward of the edit address point is at point A. In the next step ST2, the locate (pre-roll) address is compared with the first value of address information of the medium to determine whether the instructed locate position is forward of the head of the medium. If the instructed locate position is forward of the head of the medium, then the process goes to step ST4. If the instructed locate position is behind the head of the medium, then the process goes to step ST3. In step ST3, the system controller 13 controls the control circuit 14, and locates the medium at the instructed address (pre-roll). Then, the control proceeds to step ST5.

Figure 4:
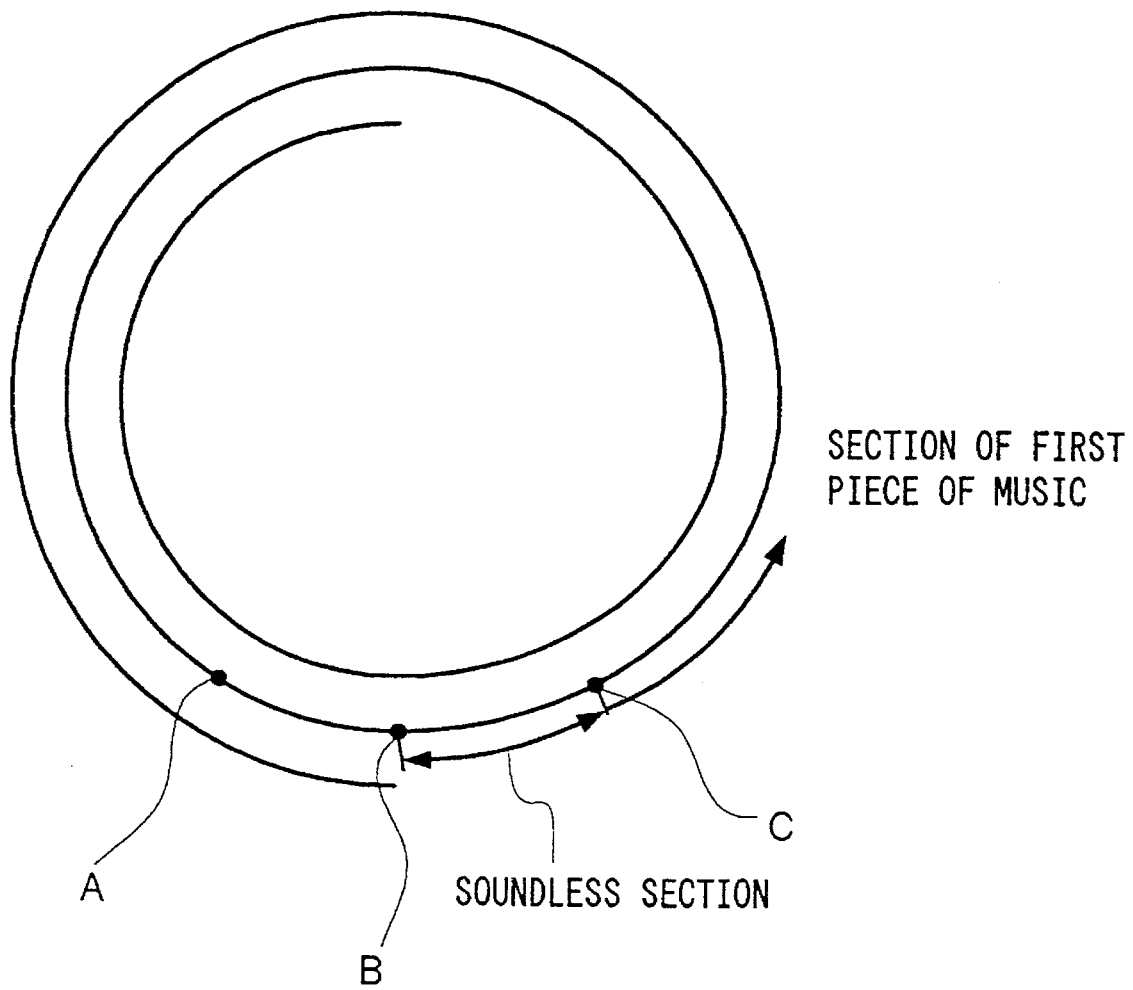
FIG. 4 is a diagram showing positions of information on a compact disc taken as an example to which the invention is applied.

In step ST4, however, under acknowledgement that the first address is forward of the head of the medium, the system controller 13 locates the medium at a reproducible certain address (second address), i.e. point B of FIG. 4, and the control proceeds to step ST5. In FIG. 4, the reproducible certain address (second address) is at point B of FIG. 4. In compact discs, in general, even if the first one of addresses assigned to a first piece of music is at point B, the first music actually starts from point C, and the section from point B to point C is a so-called soundless section. No address for editorial use is prepared at point A. Thus, point B is a reproducible address. In step ST5, the first address (virtual address) at point A instructed in step ST2, or the located (pre-rolled) address in step ST3, is set in the address output circuit 15. When the address instructed in step ST2 is the first address (point A), the address at point A (first address) is set in the address output circuit 15. Then, the address output circuit 15 supplies an address information signal to the address input (P) terminal 10 of the editor 1, and the system controller 13 gives the remote (P) terminal 9 of the editor 1 a notice that the locate process has been completed. Thus, the control proceeds to step ST7 and ends there.

Figure 3:
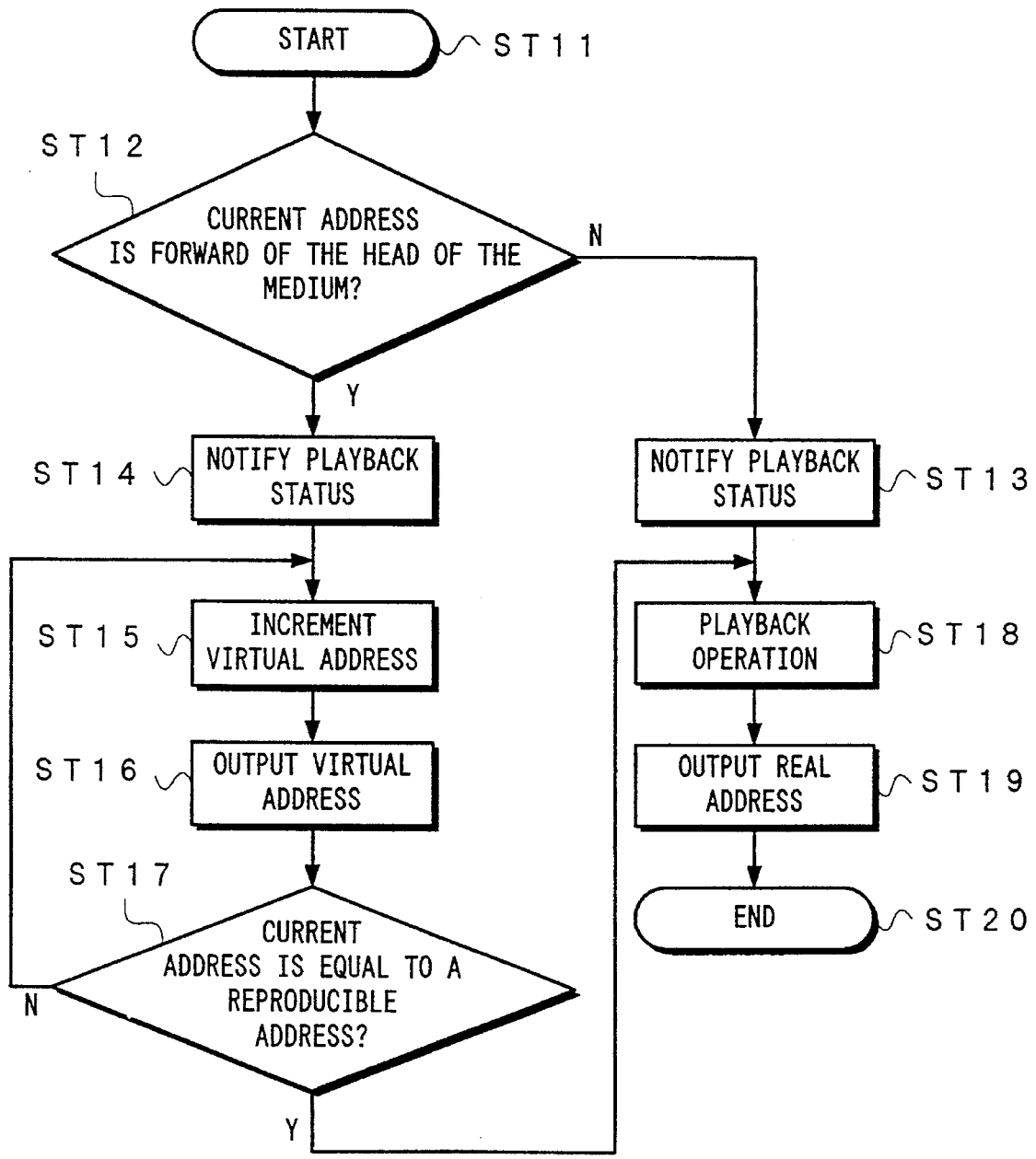
FIG. 3 is a flow chart of a playback operation according to the first embodiment of the invention.

FIG. 3 shows a sequence of behaviors of the system controller 13 during reproduction in the first embodiment of the invention. In step ST11, a command for reproduction is given from the editor 1 to the information reproducer 3. In the next step ST12, comparison is made to determine whether the current address is forward of the head of the medium. If the current address is forward, then the control goes to step ST14. If the current address is behind, the control goes to step ST13. In step ST13, under acknowledgement that the current address is behind the head of the medium, the system controller 13 makes the reproducer start the reproduction from the located (pre-rolled) address toward the edit address point.

On the other hand, in step ST14, under acknowledgement that the current address is forward of the head of the medium, the system controller 13 sustains actual reproduction from the located (pre-rolled) address toward the edit address point, and merely gives the remote (P) terminal 9 of the editor 1 a notice that the reproducer is under reproduction. Then, the control proceeds to step ST15. In step ST15, the system controller 13 sets an incremented virtual address information in the address output circuit 15 in synchronism with a synchronizing signal of a chase command, and the control goes to step ST16. That is, even when the reproducer 3 is not under reproduction, the system controller 13 increments the address, such as from A to A+1, A+2, and seq., and sets the incremented address in the address output circuit 15 in the same manner as executed when the reproducer 3 is under actual reproduction. In step ST16, the incremented virtual address information signal from the address output circuit 15 is given to the address input (P) terminal 10 of the editor 1, and the control goes to step ST17. In this manner, the system controller 13 can behave as if the reproducer 3 were under reproduction.

In step ST17, the current address is compared with a reproducible certain address to determine whether they are equal. If they are not equal, the control returns back to step ST15 (increment of the virtual address). If the current address is equal to the reproducible certain address (address at point B of FIG. 4), reproduction is actually executed from the located (pre-rolled) address (address at point B) toward the edit address point (address at point C), and the process proceeds to step ST18. In step ST18, the system controller 13 controls the control circuit 14 and the reproducing circuit 17 to execute reproduction toward the edit address point. In step ST19, real address information (the address actually read out from the medium) is sent from the system controller 13 and set in the address output circuit 15. Then, the address output circuit 15 delivers a real address information signal to the address input (P) terminal 10 of the editor 1, and the control goes to step ST20 to end there.

During the reproducing operation, the editor 1 monitors address information from the information recorder 2 and from the information reproducer 3 to monitor whether they are synchronous with each other. If not, the editor 1 controls them to establish their synchronization. Even when the information reproducer 3 is under virtual reproduction where actual reproduction does not take place, the editor 1 performs the same control for synchronization, that is, behaves as if the system were under normal operation. Therefore, the head of the medium (point C of FIG. 4) can be reproduced and edited in the information reproducer 3 through the control from the editor 1 as explained above.

Figure 5:
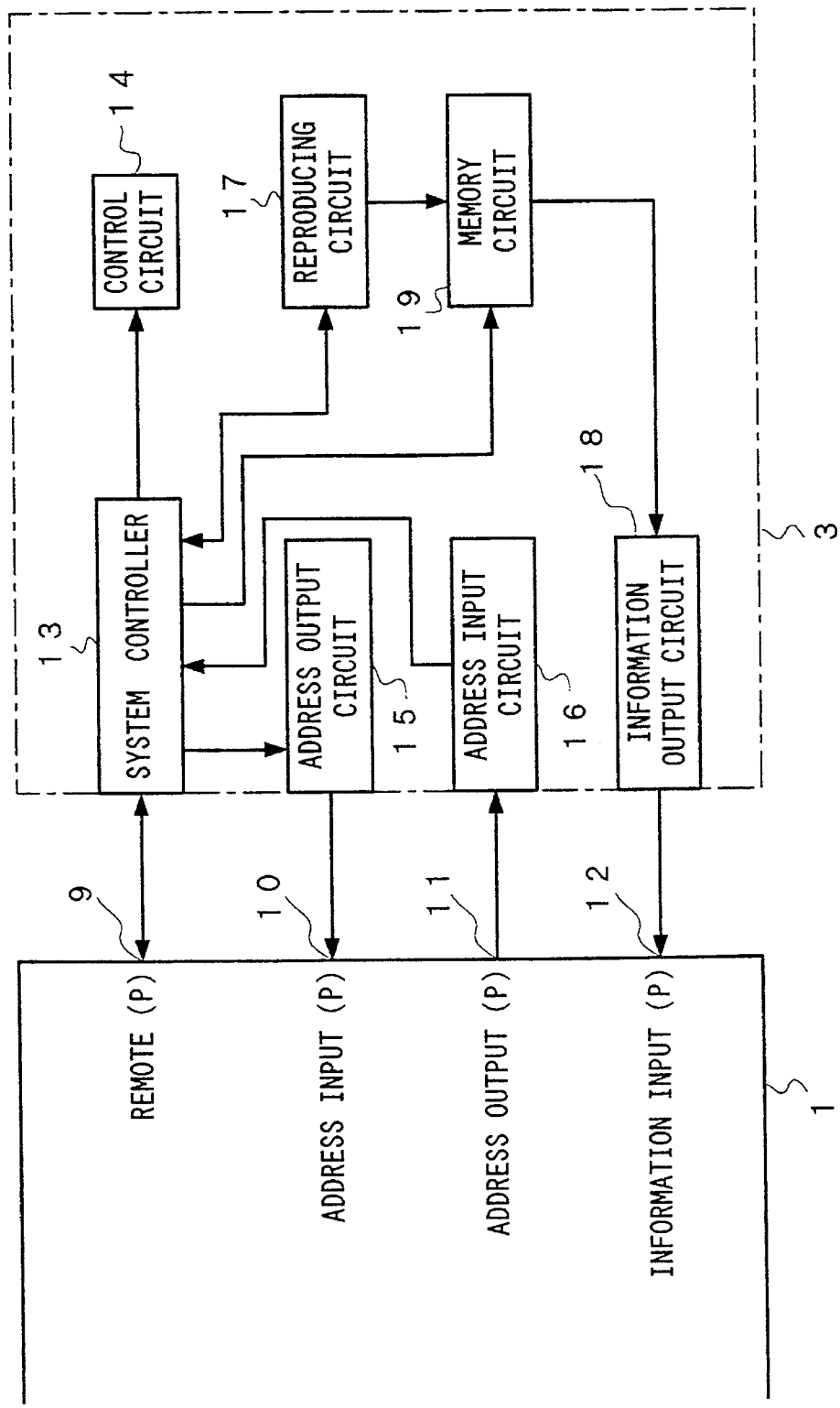
FIG. 5 is a block diagram showing the construction of an information signal edit system according to a second embodiment of the invention.

FIG. 5 shows the construction of an information signal reproducer according to the second embodiment to which the invention is applied. The embodiment of FIG. 5 is different from the first embodiment of FIG. 1 in having a memory circuit 19 in the information reproducer 3. The memory circuit 19 is interposed between the reproducing circuit 17 and the information output circuit 18, and connected to the system controller 13. The other aspect of FIG. 5 is the same as already explained with reference to FIG. 1.

In the first embodiment, since it takes a time for a compact disc reproducer, a tape reproducer, or the like, to start reproducing operation, it may happen that information reproduced with a delay of a certain time from a certain reproducible address is output actually. In this case, the memory circuit 19 is provided after the reproducing circuit 17 to store information for a longer time than the certain time and to output the information from the reproducible certain address through the memory circuit 19. In this manner, information can be output without delay. The memory circuit 19 used here is designed to store signals for five seconds.

Figure 6:
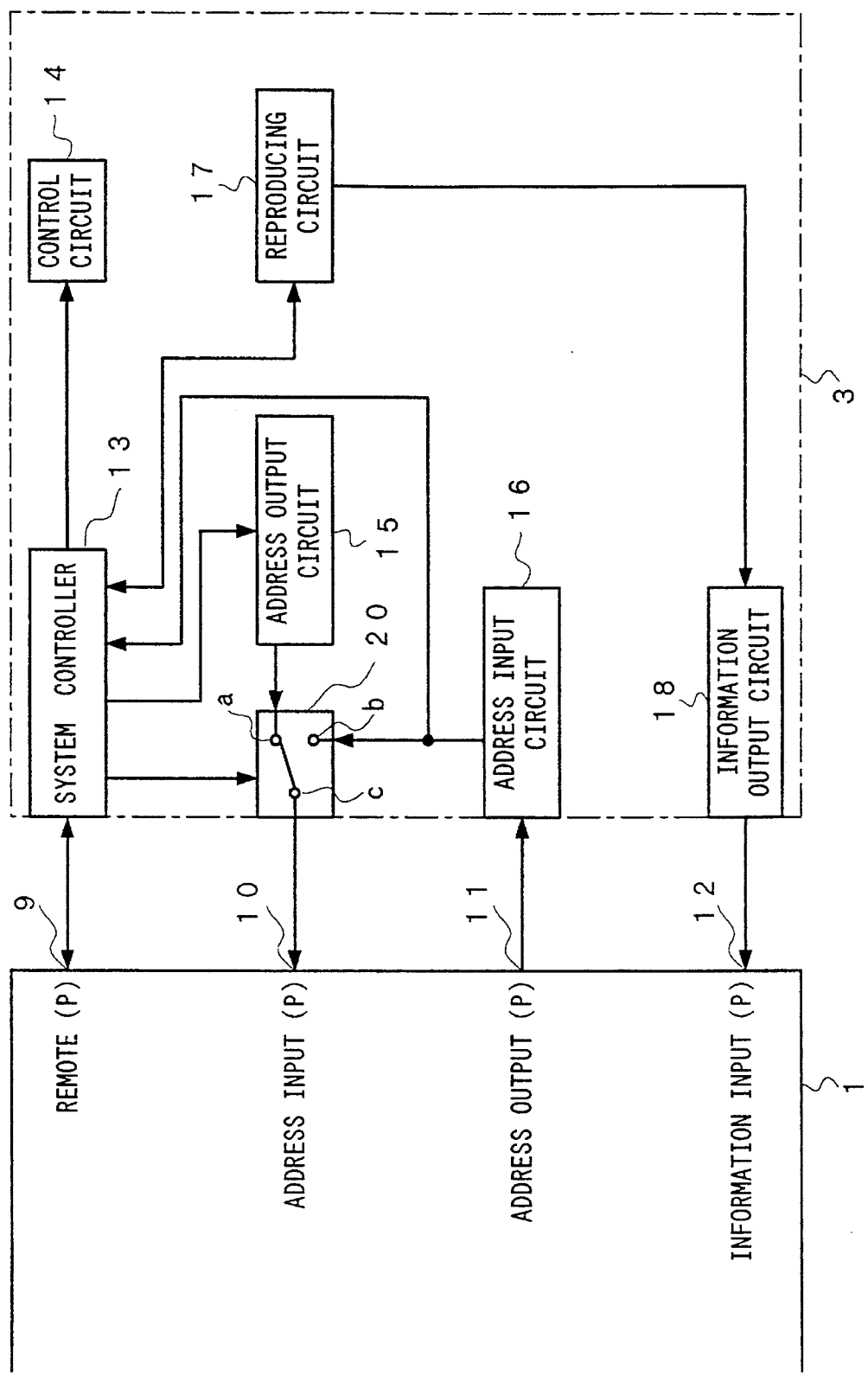
FIG. 6 is a block diagram showing the construction of an information signal edit system according to a third embodiment of the invention.

FIG. 6 shows the construction of an information signal edit system according to a third embodiment of the invention. It is the case where an address information signal is output from the address output (P) terminal 11 to the information reproducer 3 during reproduction and chase reproduction. To cope with the case, the third embodiment of FIG. 6 uses an address output switching circuit 20 in addition to the construction of the first embodiment of FIG. 1.

Under control of the system controller 13, the address output switching circuit 20 can selectively change its output to the address input (P) terminal 10 of the editor 1 such that incremented virtual address information from the address output circuit 15 under virtual reproduction is supplied through contacts a–c, or address information signal coming from the editor 1 to the address input circuit 16 is supplied through contacts b–c. When the terminals b–c are connected in the address output switching circuit 20 during virtual reproduction, the system controller 13 need not control the increment of the virtual address information. When the address under reproduction becomes equal to the reproducible certain address, the real address information signal can be output from the address output circuit 15 through the contacts a–c of the address output switching circuit 20 to the address input (P) terminal 10 of the editor.

This is explained with reference to FIG. 3. The system controller 13 controls the address output switching circuit 20 to connect the terminals b–c in step ST14 and to connect the terminals a–c when the job of step ST17 results in "Y". In this manner, during virtual reproduction (the period from point A to point B in FIG. 4), the address information signal from the address output terminal 11 of the editor 1 is input to the address input terminal 10 of the editor via the address input circuit 16 and the address output switching circuit 20 in the reproducer 3. Therefore, although the editor 1 always receives the address information signal that is its own output signal, the editor 1 processes it as if it were an address information signal from the reproducer 3. Thus, when the address signal from the address output terminal 11 of the editor 1 becomes equal to the reproducible address, i.e. the address at point B of FIG. 4, in step ST 17, the system controller 13 controls the address switching circuit 20 to connect its terminals a–c such that the address information signal of the actual reproduced signal enters the address input terminal 10 of the editor 1 through the address output circuit 15 for the chase operation.

Figure 7:
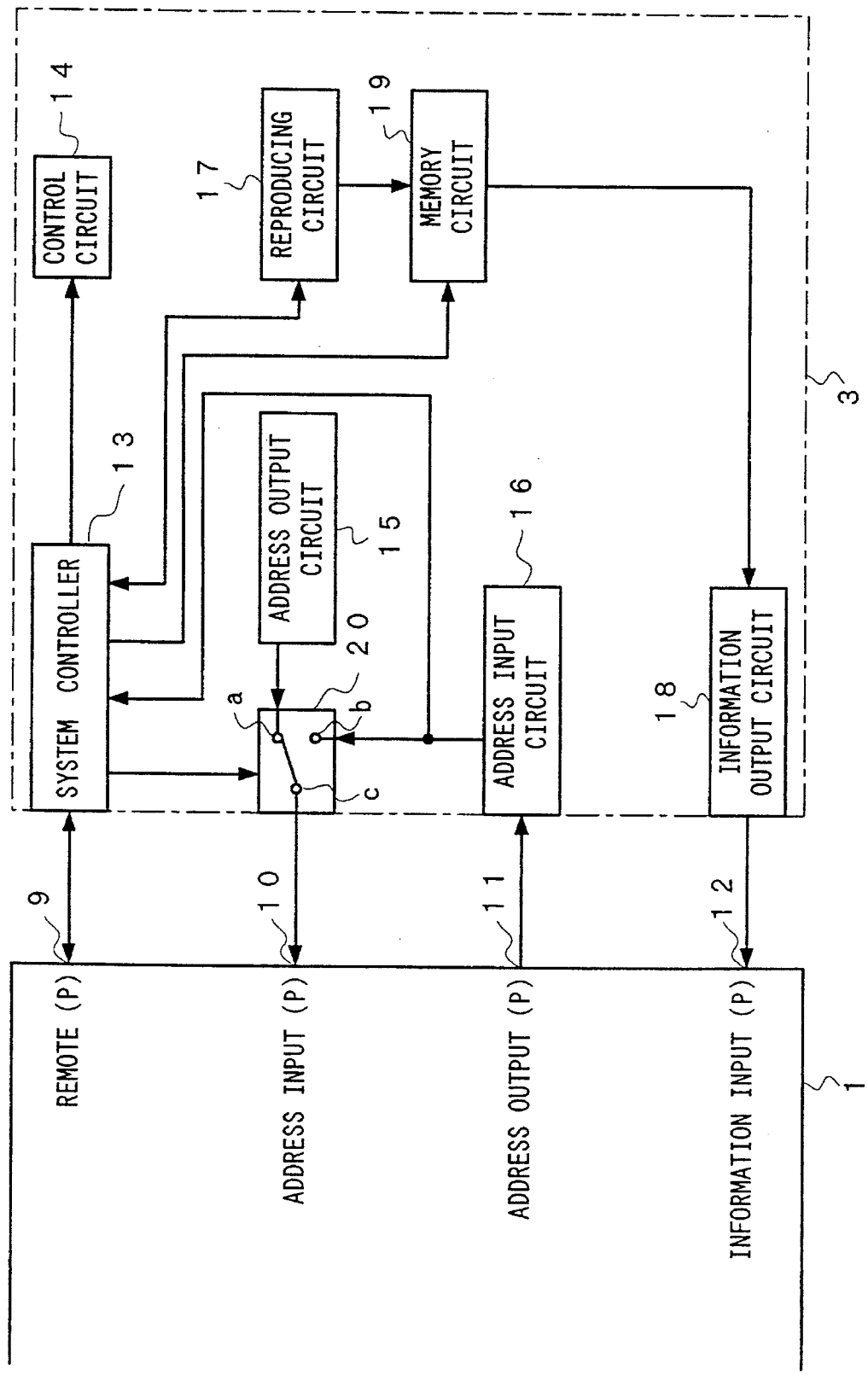
FIG. 7 is a block diagram showing the construction of an information signal edit system according to a fourth embodiment of the invention.

FIG. 7 shows the construction of an information signal edit system according to the fourth embodiment of the invention. This system combines the address output switching circuit 20 with the construction of the second embodiment shown in FIG. 5 in order to cope with the case where the address information signal is output from the address output (P) terminal 11 of the editor 1 to the information reproducer 3 during reproduction and chase reproduction.

Under control of the system controller 13, the address output switching circuit 20 can selectively change its output to the address input (P) terminal 10 of the editor 1 such that incremented virtual address information from the address output circuit 15 under virtual reproduction is supplied through contacts a–c, or address information signal coming from the editor 1 to the address input circuit 16 is supplied through contacts b–c. When the terminals b–c are connected in the address output switching circuit 20 during virtual reproduction, the system controller 13 need not control the increment of the virtual address information. When the address under reproduction becomes equal to the reproducible certain address, the real address information signal can be output from the address output circuit 15 through the contacts a–c of the address output switching circuit 20 to the address input (P) terminal 10 of the editor. These behaviors are the same as those explained with reference to the third embodiment.

Figure 8:
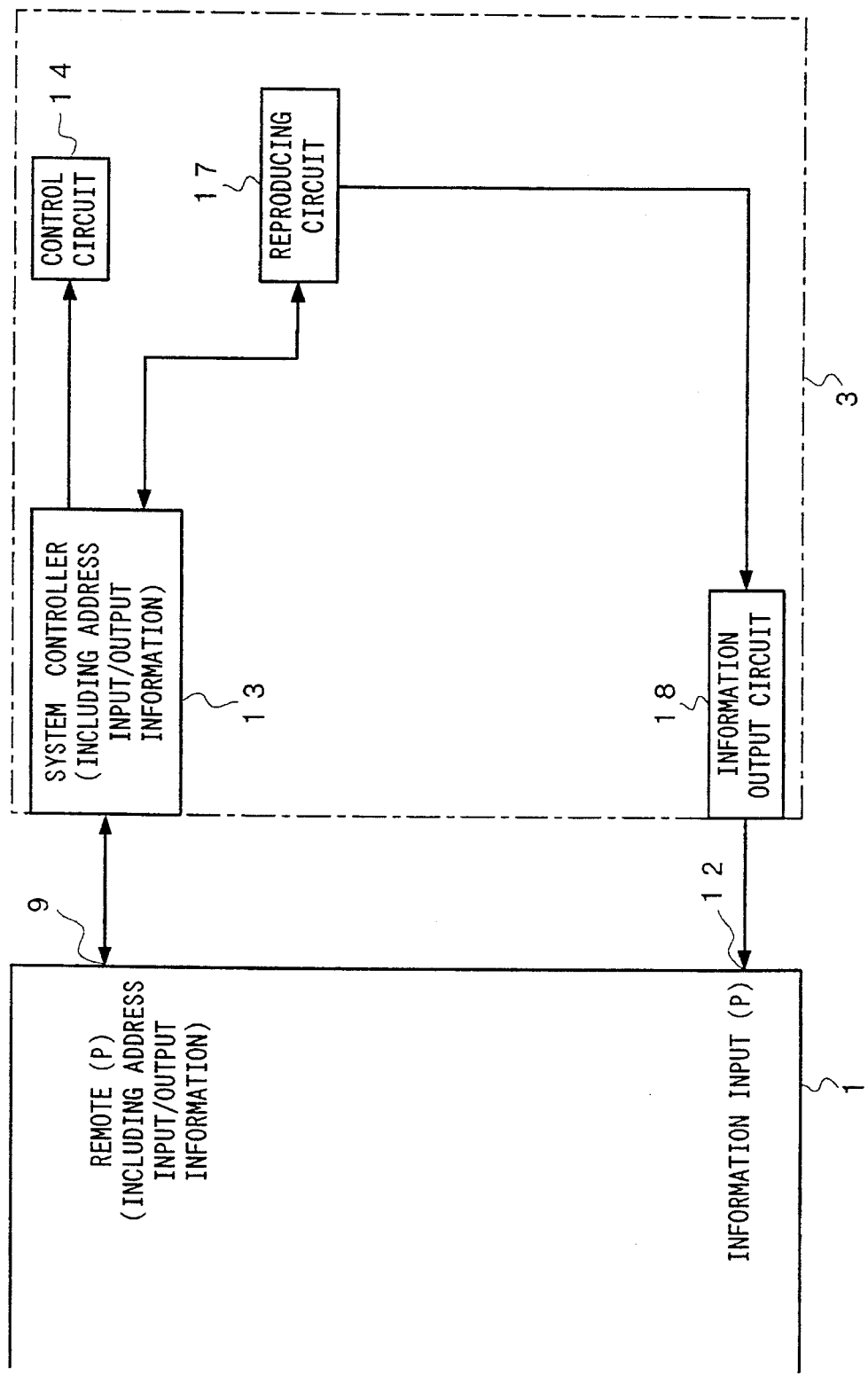
FIG. 8 is a block diagram showing the construction of an information signal edit system according to a fifth embodiment of the invention.

FIG. 8 shows the construction of an information signal edit system according to the fifth embodiment of the invention. When an address in/out information is contained in the interface between the remote (P) terminal 9 of the editor 1 and the system controller 13 of the information reproducer 3, the system need not include individual address in/out circuit elements (for example, address input (P) terminal 10, address output (P) terminal 11, address output circuit 15, address input circuit 16, and so on, in FIG. 1), as shown in FIG. 8.

Figure 9:
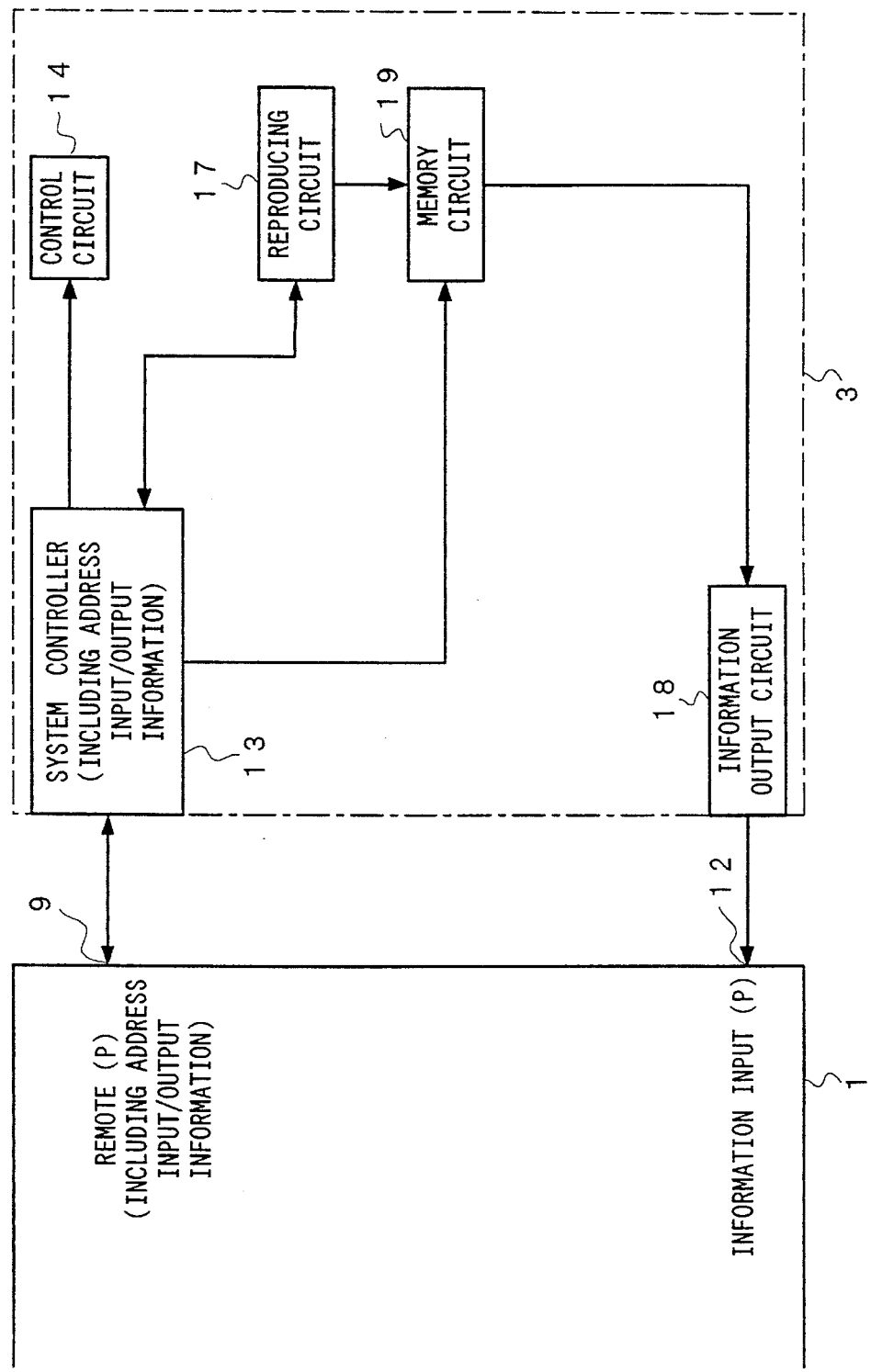
FIG. 9 is a block diagram showing the construction of an information signal edit system according to a sixth embodiment of the invention.
Figure 10:
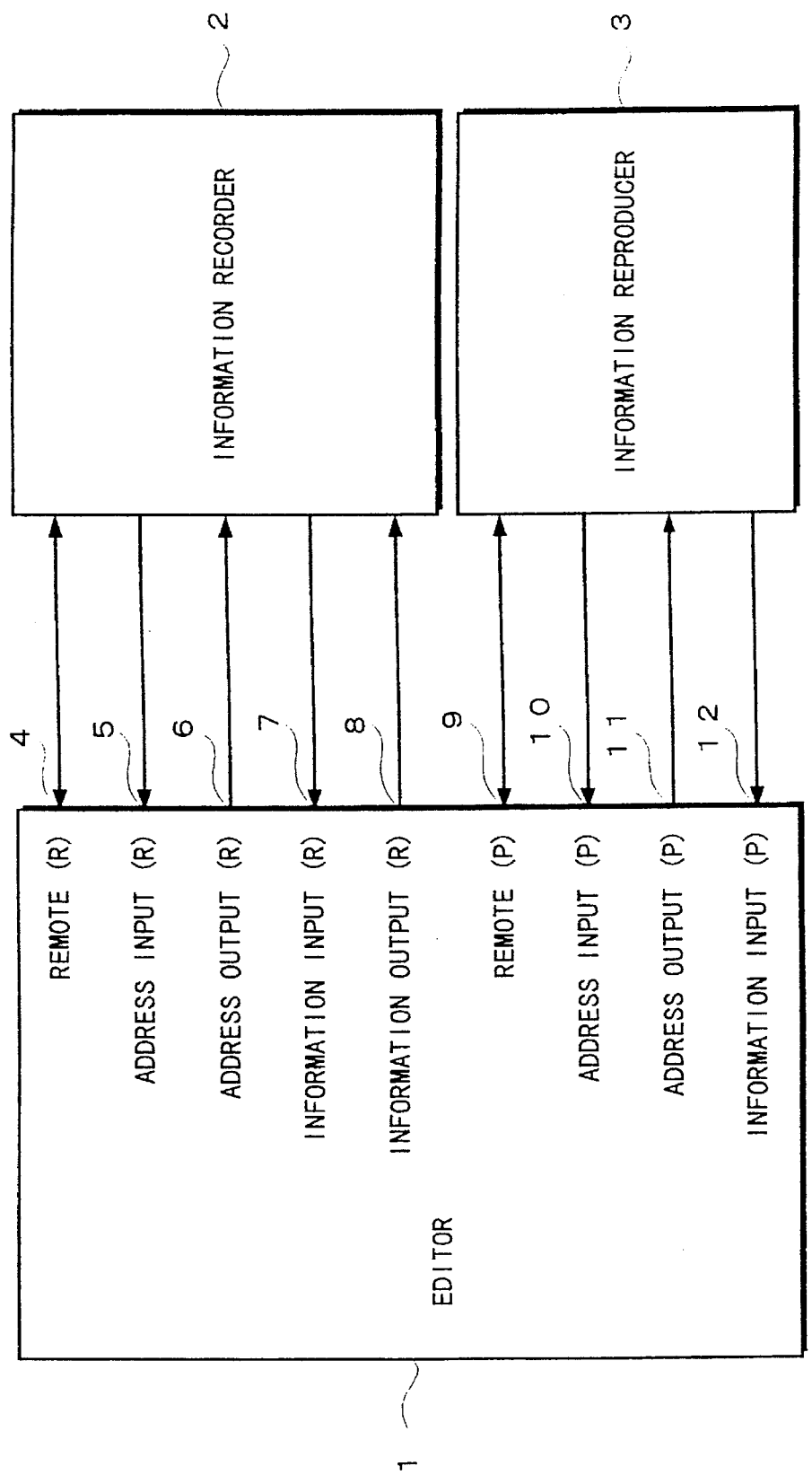
FIG. 10 is a block diagram showing a conventional edit system.

FIG. 9 shows the construction of an information signal edit system according to the sixth embodiment of the invention, which combines the memory circuit 19 with the construction of the fifth embodiment shown in FIG. 8. If the interface signal between the remote (P) terminal 9 of the editor 1 and the system controller 13 of the information reproducer 3 contains an address in/out information, the system need not use individual address in/out circuit elements as shown in FIG. 9.

The invention is useful not only for systems using a compact disc reproducer as the information reproducer but also for systems using another type disk reproducer, tape reproducer, semiconductor storage device, and so forth, for use with a medium having information recorded at its head. The interface between the editor and the information reproducer may be wireless. The invention is not limited to embodiments shown and described above, but can be modified into other various forms including appropriate combinations of the embodiments shown above.

In conclusion, the invention makes it possible to reproduce and edit information recorded on a head portion of a medium having recorded information from its head, through operation from an editor requiring pre-roll, by virtually operating the information reproducer.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An information signal edit method using an editor, a recorder and a reproducer, comprising:

a first step locating a first address forward of an edit point address on a recording medium in response to an instruction from the editor to the reproducer;

a second step determining whether the first address is forward of or behind a head address of said recording medium on which recorded is an information signal to be reproduced by said reproducer;

a third step performed when the second step results in determining that said first address is forward, and positioning a reproducing element for said recording medium at a second address which is reproducible and located between said first address and said edit point address on said recording medium;

a fourth step commanding reproduction of said recording medium from said editor to said reproducer;

a fifth step supplying address information sequentially incremented from said first address from said reproducer to said editor;

a sixth step comparing said incremented address information with said reproducible second address; and a seventh step performed when said incremented address information becomes equal to said reproducible second address, and starting actual reproduction of said recording medium.

2. The information signal edit method according to claim 1, wherein said recording medium is a disk.

3. The information signal edit method according to claim 1, wherein said seventh step including a step for storing reproduced information signals for a predetermined time.

4. An information signal edit system including an editor, recorder and a reproducer, said reproducer comprising: address input means to which first address information forward of an edit point address by a given number of addresses is supplied from said editor; address output means for outputting current address information of a recording medium to said editor; system control means coupled to said address input means and said address output means to control behaviors of said reproducer; a reproducing circuit controlled by said system control means to reproduce an information signal from said recording medium; and an information output circuit for supplying said editor with an information signal reproduced by said reproducing circuit, said system control means including detector means for detecting whether said first address information is forward of or behind a head address of said recording medium, in response to a result of the detection indicating that said first address information is forward, said system control means setting said reproducer in a virtual reproducing mode and causing said address output means to send address information sequentially incremented from said first address to said editor, in response to a result of detection of said system controller that said incremented address information is equalized to a reproducible address on said recording medium, said system control means instructing that actual reproduction of said recording medium be started, and supplying address information obtained from said recording medium to said editor via said address output means.

5. The information signal edit system according to claim 4, wherein said reproducer includes memory means interposed between said reproducing circuit and said information output circuit to store output signals from said reproducing circuit for a predetermined time.

6. The information signal edit system according to claim 4, wherein a switching means is interposed between said address output means and said editor to switch connection between said editor and said reproducer such that an output of said address input means is supplied to said editor through said switching means when said address information sequentially incremented from said first address is different from said reproducible address of said recording medium, and an output of said address output means is supplied to said editor through said switching means when said incremented address information is equalized to said reproducible address.

7. The information signal edit system according to claim 4, wherein said recording medium is a disk.

* * * * *